Figure 1:
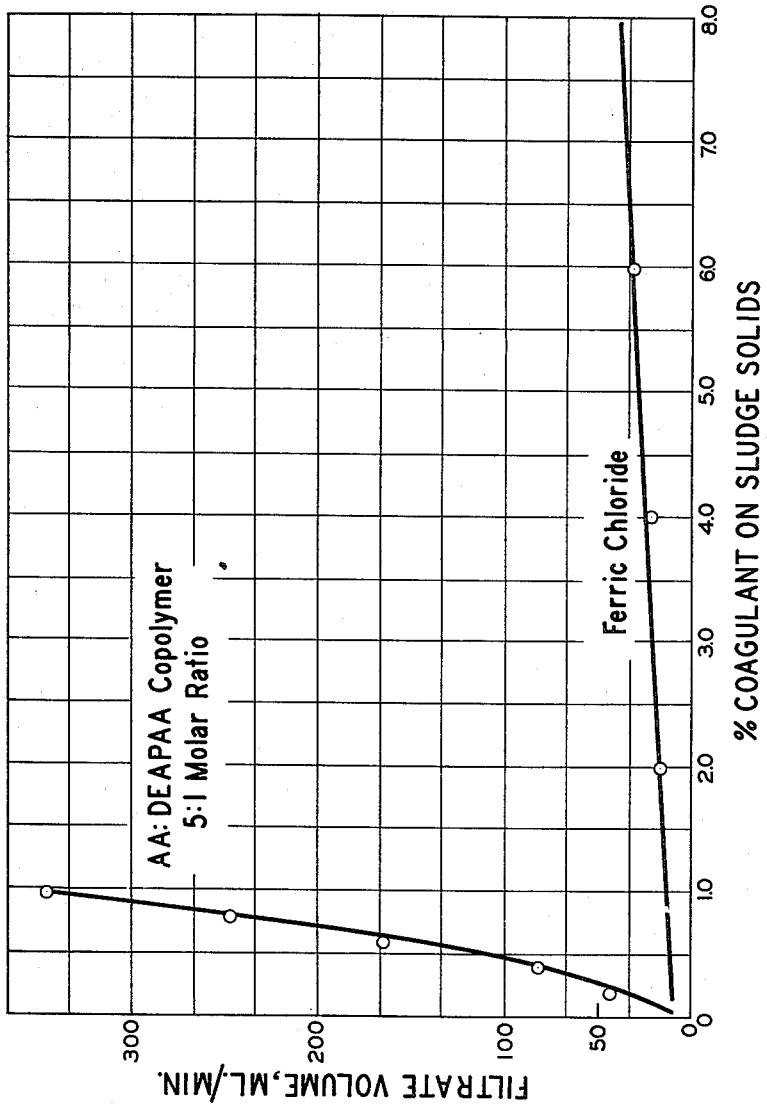

INVENTORS
CHARLES E. COLWELL
ROBERT C. MILLER
BY Patrick P. Tetta
ATTORNEY

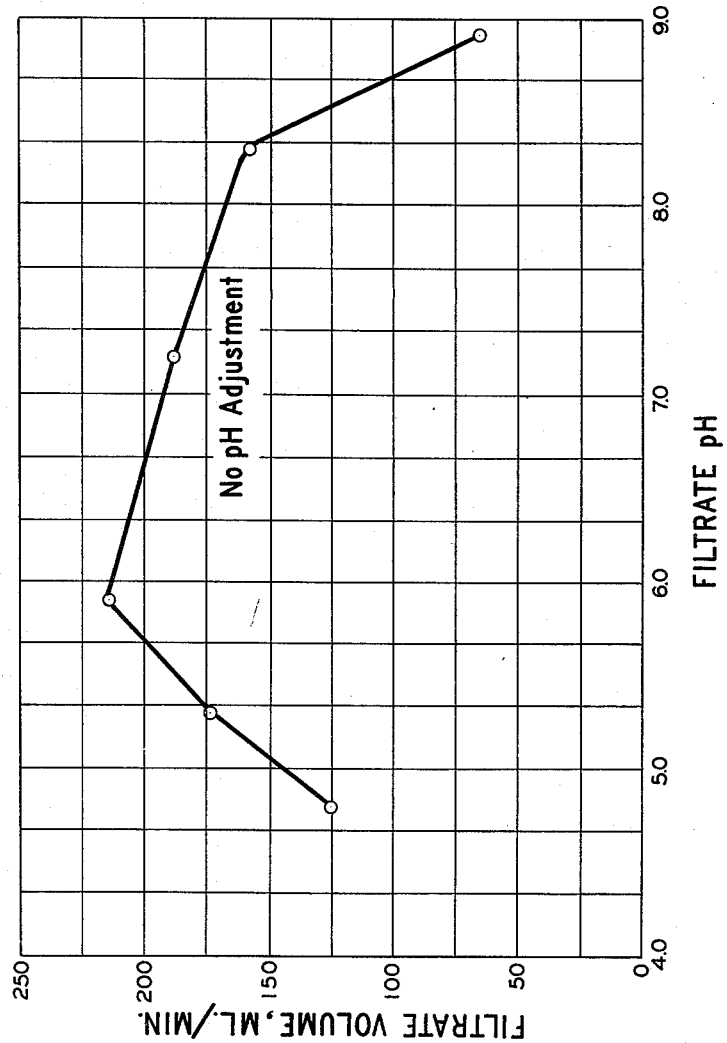

3,014,896
POLYMERIC FLOCCULATING AGENTS AND PROCESS FOR THE PRODUCTION THEREOF
Charles E. Colwell and Robert C. Miller, Pittsburgh, Pa., assignors to Union Carbide Corporation, a corporation of New York
Original application Oct. 17, 1956, Ser. No. 616,516. Divided and this application Oct. 30, 1958, Ser. No. 770,602
4 Claims. (Cl. 260—80.3)

This invention relates to a method for flocculating the solid matter in aqueous colloidal systems which are stabilized by a negative charge, and to a flocculant therefor.

The separation of the suspended solid matter in an aqueous colloidal system that is stabilized by a negative charge from the aqueous medium is an industrial problem of considerable importance. For example, present anti-pollution laws require that the solids content of waste water be reduced to a fixed maximum value before discharging in a stream. In many cases, the solids are present in the waste water as negatively-charged colloids requiring costly and difficult treatment prior to disposal. Because of the stability of the suspension and the small size of the suspended particles, sedimentation and filtration procedures are relatively ineffective without prior flocculation of the suspended matter.

The problems met in the treatment and disposal of sewage typify the problems found in industrial treatment of negatively charged colloids.

Sewage treatment and disposal requires the separation of large quantities of water from the solid matter present in sewage sludges. Such large water loads together with the intractable nature of the solids involved have made direct filtration slow, difficult and costly; sedimentation of the solids prior to filtration is practiced wherever feasible since it serves to reduce filtration costs.

Similarly, sedimentation is a time-consuming process because colloidal and pseudocolloidal organic and inorganic matter which comprise a large part of the total sludge solids settle out of suspension at very low rates. In addition, the fine particles tend to blind the filter media resulting in poor filtration.

These sedimentation and filtration problems have been solved by flocculation of the fine particle-size solids prior to and during sedimentation and filtration. Various iron and aluminum salts, bentonite clay, activated silica, etc., have been employed as coagulants in some form. All of these exhibit to some degree, the following limitation:

(1) The maximum filtration rates obtainable by normal good practice are low in comparison to the standards established in other industrial filtration processes.

(2) The corrosive nature of inorganic-type coagulants increases construction and maintenance costs.

(3) A high coagulant dosage is necessary for maximum efficiency. In large plants this may involve handling several tons of reagent daily.

(4) The addition of large amounts of inorganic matter to the sludge in the form of coagulant detracts from the end-use value of the sludge either as a fuel or as a fertilizer.

Examples of negatively charged colloids that are difficult to separate from the suspending media are common in industry. In the paper industry, the "white water" filtrate from a paper machine contains suspended pulp fines that must be removed. The ground wood used for the manufacture of paper is dewatered prior to shipment. In the metallurgical field the removal of suspended silica from slurries is desirable in many beneficiation processes. In still another field of research is found the problem of flocculating blood solids that have been inhibited against natural coagulation.

It is an object of this invention to provide a method for the rapid dewatering of the suspended matter in an aqueous colloidal system that is stabilized by a negative charge, and particularly negatively charged colloids such as sewage sludge, "white-water" wastes, ground wood pulp slurries, silica suspensions, and whole blood.

It is another object to provide a flocculating agent that is superior to previously known flocculants.

Other objects will be apparent from the disclosure.

The objects are achieved by employing organic flocculating reagents comprising water-soluble linear polymers containing a plurality of water solubilizing radicals of which at least a part are cationic in nature.

By the term "water solubilizing radical" is meant any grouping of atoms which when attached at intervals along a linear hydrocarbon polymer chain tends to increase the solubility of the polymer in water.

Reagents satisfactory for the practice of this invention may be represented by the structural formula:

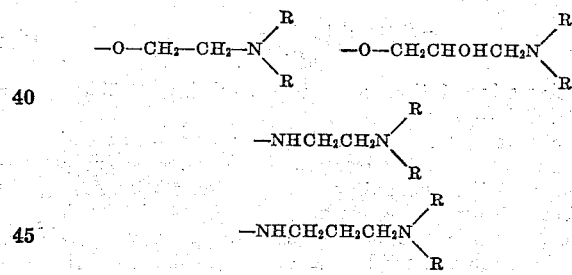

wherein "X" is a cationic grouping, "Y" is a nonionic solubilizing radical, "a" indicates the ratio of nonionic to cationic units, "n" denotes the degree of polymerization.

The cationic groupings

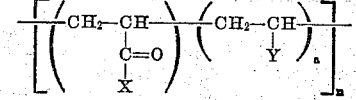

wherein R is either a methyl or an ethyl radical, find application in this invention.

Similarly the groupings —$CONH_2$, —OH and
—$CO_2CH_2CH_2OCH_3$
are satisfactory nonionic solubilizing radicals.

Compositions, viscosities and performance data with sewage sludge of some of these improved flocculating reagents are summarized and compared to sludge coagulation with no reagent and with a typical reagent such as ferric chloride, in Table I.

The filtration rate was determined by the following procedure.

The coagulant was mixed with 300 grams of an unelutriated digested sludge containing 6 percent dry solids, and stirred for 15 minutes with a wide paddle stirrer rotated at 120 revolutions per minute. A 5.5 centimeter diameter filter leaf fitted with a No. 40 Whatman paper was inserted in the sludge for a 30-second filter cycle at a pressure of 30 millimeters of mercury, and then raised to a vertical position for a drainage period of 2 minutes.

The total volume of filtrate collected was measured, and the filtration rate in milliliters per minute was determined.

TABLE I

*Digested sludge filtration rates with a variety of cationic polymers and copolymers*

| Coagulant Composition | Viscosity of Coagulant Solution cstks. at 20° C. (Concentration at 0.5% unless otherwise indicated) |
|---|---|
| None | -- |
| Ferric Chloride | -- |
| Polydiethylaminoethyl acrylate | 21 |
| Polydimethylaminoethyl acrylate | 34 |
| Polydiethylaminoethyl acrylamide | 54 |
| Polydiethylaminopropyl acrylamide | 34 |
| Diethylaminoethylacrylate-Acrylamide Copolymer (1:1) | 75 (0.25%) |
| Polydimethylaminopropyl acrylamide | [1] 144 (0.25%) |

[1] This polymer was not completely soluble in water.

| Coagulant Composition | Percent Coagulant Based on Sludge Solids | Filtrate Volume ml./min. |
|---|---|---|
| None | 0 | 5 |
| Ferric Chloride | 6.0 | 30 |
| Polydiethylaminoethyl acrylate | 0.5 | 75 |
| Polydimethylaminoethyl acrylate | 0.9 | 61 |
| Polydiethylaminoethyl acrylamide | 0.6 | 101 |
| Polydiethylaminopropyl acrylamide | 0.6 | 112 |
| Diethylaminoethylacrylate-Acrylamide Copolymer (1:1) | 0.6 | 114 |
| Polydimethylaminopropyl acrylamide | 0.6 | 118 |

As may be seen from the table, the polymeric cationic reagents increase the filtration rate of sewage sludge to at least twice that obtained when using ferric chloride as the flocculant, and in some cases almost four times, at a tenth of the coagulant dosage.

However, still greater improvement in filtration rate is possible by employing preferred reagents corresponding to the previously defined structural formula wherein X is

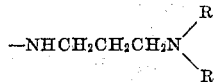

"R" being selected from the group consisting of $CH_3$— and $CH_3CH_2$—, and Y is —$CONH_2$.

These novel polymeric materials are the copolymers of acrylamide (AA) and at least one member of the group consisting of diethylaminopropylacrylamide (DEAPAA) and dimethylaminopropylacrylamide (DMAPAA). Typical preparations of these copolymers are summarized in Table II wherein the acrylamide and dialkylaminopropylacrylamide molar charge ratios are varied over a range of 1:1 to 13:1. In addition to the reactants shown in the table, each polymerization charge also contained 1 milliliter of 0.1% aqueous ferrous sulfate solution and 2 milliliters of 1% aqueous potassium persulfate solution. In these examples, the polymerization temperature was about 60° C. and the polymerization time was about 30 minutes.

The degree of monomer dilution at the onset of polymerization and throughout the ensuing period of polymer growth has a pronounced effect on the ultimate molecular weight of the polymer. When only a small amount of water is present in the reaction mixture, a tough aqueous gel results which is water disperible but not completely soluble. This insolubility is attributed to an excessively high degree of polymerization. As the amount of water in the reaction mixture is increased, the probability of the growing polymer chain reacting with monomer is reduced while the probability of various chain-terminating steps taking place is increased. These factors are believed to be responsible for a progressive reduction in the degree of polymerization as the amount of water in the reaction mixture is increased. Thus, for the preparation of a copolymer of optimum molecular weight, there will be a definite water concentration in the reaction mixture.

For improved yields, a polymerization initiator should be employed; initiators of the persulfate type have given such improved results.

Rapid polymerization ensued at elevated temperatures. A temperature range of from about 60° C. to about 100° C. was found to provide a high but controllable polymerization rate.

The products resulting in the tests were stiff gels having from about 10 percent to about 35 percent active solids. Ferrous sulfate in the reaction mixture is believed to decrease the gel time with no apparent effect on the product viscosity. However, it is not an essential addition to the reaction mixture.

The viscosity of a polymer solution is a function of the polymer molecular weight and increases with increasing molecular weight. The viscosity is also influenced by polymer composition such that the relative contributions of molecular weight and of the nonionic-cationic ratio to the resultant viscosity cannot be clearly defined. It is apparent from Table II, however, that the viscosity decreases as the percentage of the cationic monomer in the charge is reduced.

The effect of acid in the reaction mixture is demonstrated in Table III. In each example, the reaction mixture comprised 1.53 grams dimethylaminopropylacrylamide, 3.47 grams acrylamide, 30 grams of water, 1.0 milliliter of a 1.0 percent solution of potassium persulfate and with the exception of the example wherein no acid was added, approximately equivalent amounts of the designated acid. The monomers were copolymerized at 60° C. for 30 minutes. The copolymer was diluted with water and the viscosity of the solution was determined at 20° C.

TABLE II

*Preparation of typical cationic sludge conditioners*

| Polymerization Charge | DMAPAA-AA Molar Ratios | | | | | | | | DEAPAA-AA Molar Ratios | | | | | |
|---|---|---|---|---|---|---|---|---|---|---|---|---|---|---|
| | 1:1 | 1:3 | 1:5 | 1:5 | 1:7 | 1:9 | 1:11 | 1:13 | 1:1 | 1:3 | 1:5 | 1:5 | 1:7 | 1:9 |
| DMAPAA grams | 6.88 | 4.22 | 3.06 | 3.06 | 2.38 | 1.96 | 1.66 | 1.44 | | | | | | |
| DEAPAA grams | | | | | | | | | 7.22 | 4.86 | 3.42 | 3.42 | 2.70 | 2.24 |
| AA do | 3.12 | 5.78 | 6.94 | 6.94 | 7.62 | 8.04 | 8.34 | 8.56 | 2.78 | 5.14 | 6.58 | 6.58 | 7.30 | 7.76 |
| Glacial Acetic Acid grams | 2.64 | 1.62 | 1.18 | 1.18 | 0.92 | 0.68 | 0.64 | 0.56 | 2.36 | 1.58 | 1.12 | 1.12 | 0.88 | 0.74 |
| Water do | 80 | 80 | 80 | 60 | 60 | 60 | 50 | 50 | 40 | 40 | 40 | 20 | 40 | 40 |
| Viscosity at 20° C. and 0.25% Copolymer Concentration cstks | 63 | [1] 96 | 65 | 85 | 82 | 56 | 42 | 36 | 67 | 53 | 55 | 79 | 50 | 38 |

[1] Minute gel particles were visible in this coagulant solution indicative of incomplete solubility.

TABLE III

| Acid | Amount of Acid, grams | Copolymer Dilution, Percent | Viscosity, centistokes |
| --- | --- | --- | --- |
| None | | 0.5 | 2.1 |
| 37% Hydrochloric | 0.97 | 0.5 | 19.8 |
| 96% Sulfuric | 0.51 | 0.5 | 58.7 |
| Acetic | 0.59 | 0.25 | 55.8 |

Examination of the viscosity data in Table III shows that a reaction mixture containing no acid produces a relatively low molecular weight product whereas acetic acid in the reaction mixture considerably increases the degree of polymerization. Acids stronger than acetic acid, e.g., hydrochloric or sulfuric, have a beneficial influence on the polymerization but produce lower molecular weight products than acetic acid. For maximum benefit, acid should be present in an amount sufficient to neutralize the basic monomer.

Hereinafter the invention will be described with respect to these preferred coagulants, the copolymer of diethyl- and dimethyl-aminopropylacrylamide with acrylamide.

The effect of viscosity and of nonionic to cationic unit ratio, "$a$" on coagulant performance is demonstrated with sewage sludge in Table IV. The organic coagulants were added as 0.25 percent aqueous solutions for which the viscosities are given as a relative indication of the degree of polymerization, "$n$." The filtration rate was determined as in the examples of Table I.

TABLE IV

Filtration improvement in digested sludge with the preferred copolymer coagulants

| Coagulant | Viscosity of 0.25% Coagulant Solution cstks., 20° C. | Percent Coagulant based on Sludge Solids | Filtrate Volume, ml./min. |
| --- | --- | --- | --- |
| None | | 0 | 5 |
| Ferric Chloride | | 6.0 | 30 |
| Polyacrylamide | 6 | 0 | 6 |
| Polydimethylaminopropylacrylamide [1] | 144 | 0.6 | 118 |
| Polydiethylaminopropylacrylamide | 34 (0.5%) | 0.6 | 112 |
| AA-DMAPPA copolymers having "$a$" values of: | | | |
| 1 | 63 | 0.6 | 90 |
| 3 [1] | 96 | 0.6 | 140 |
| 5 | 65 | 0.6 | 223 |
| 5 | 85 | 0.6 | 260 |
| 7 | 82 | 0.6 | 208 |
| 9 | 56 | 0.6 | 159 |
| 11 | 42 | 0.6 | 124 |
| 13 | 36 | 0.6 | 126 |
| AA-DEAPAA copolymers having "$a$" values of: | | | |
| 1 | 67 | 0.6 | 158 |
| 3 | 53 | 0.6 | 174 |
| 5 | 55 | 0.6 | 162 |
| 5 | 79 | 0.6 | 244 |
| 7 | 50 | 0.6 | 136 |
| 9 | 38 | 0.6 | 90 |

[1] Minute gel particles were visible in this coagulant solution indicative of incomplete solubility.

It may be seen from Table IV that high filtration values result when the viscosity of a 0.25 percent aqueous solution of the coagulant exceeds 60 centistokes at 20° C.; maximum coagulant performance is attained at the highest degree of polymerization that is consistent with complete water solubility. While the performance of the subject coagulants was found to be far superior to the performance of ferric chloride over the range of "$a$" from 0 to 13, an "$a$" value of about 5 appears to provide maximum coagulation. As "$a$" is increased beyond 13, the copolymer takes on more of the characteristics of the polyacrylamide homopolymer which has been found to be a poor coagulant. Since the cationic monomer is the most expensive ingredient, the highest value of "$a$" that is consistent with good sludge conditioning efficiency is the most desirable from an economic standpoint.

FIGURE 1 is a graph of filtrate volume as a function of the percent coagulant employed in the coagulation of sewage sludge. The data were obtained by the procedure previously described, using a 5:1, acrylamide-diethylaminopropylacrylamide copolymer (viscosity of 0.25 percent solution at 20° C. of 52 centistokes) and ferric chloride.

A small increase in coagulant addition greatly increases the filtrate volume with the polymeric coagulant while only slightly increasing the filtrate volume with ferric chloride. As may be seen from FIGURE 1, a dosage of about 0.2 weight percent of the polycationic reagent is equivalent to about 8.0 percent ferric chloride treatment.

FIGURE 2 is a graph of filtrate volume as a function of filtrate pH. Unelutriated digested sludge was treated with varying amounts of acetic acid or ammonium hydroxide to adjust the pH for the tests. The coagulant was the same as that employed for the dosage tests at a fixed dosage of 0.6 percent. High sludge conditioning capacities with the polycationic coagulants were noted over a wide pH range. Sludges from most digested sludge plants operating under normal conditions will fall within the pH range of 5.3 to 8.3.

The effect of dosage on the size of floc in sewage sludge treatment is demonstrated and compared to treatment with ferric chloride in Table V. The relative gravity-dewatering rates are also given. Sludge treated with the indicated coagulant was poured into a column fitted with a 6.5 centimeter diameter 16-mesh screen. From the liquid filtrate volume collected during a 30-minute interval, the completeness of dewatering or "percent filtration" was calculated.

TABLE V

Gravity dewatering of digested sludge

| Coagulant | Percent Coagulant based on Sludge Solids | Percent Filtration 30 min. | Percent Solids Retained on 16-mesh screen |
| --- | --- | --- | --- |
| 1:5 DMAPAA-AA Copolymer (Viscosity 0.25% solution, 52 cstks. 20° C.) | 0.2 | 23.4 | 93.1 |
| Do | 0.4 | 57.6 | 97.8 |
| Do | 0.6 | 58.7 | 99.4 |
| Do | 0.8 | 59.9 | 99.9 |
| Do | 1.0 | 59.9 | 90.9 |
| Ferric Chloride | 6.0 | 22.9 | 88.1 |

Excellent retention of the polycationic-treated sludge on both 16-mesh and 8-mesh screens is indicative of the large floc that is produced. Ferric chloride-treated sludge was not retained on an 8-mesh screen, and untreated sludge was not retained on a 16-mesh screen. The polycationic-treated sludge solids retained their particulate nature throughout the filter operation leading to a highly porous filter cake suitable for rapid air drying.

The polycationic coagulants exhibit their superior coagulating power in the agglomeration of solids of raw activated sludge as well as with the digested sludges of the previous examples. The superiority of these coagulants to ferric chloride at the same pH's and at about a tenth of the dosage is shown in Table VI. The raw activated sludge contained 0.53 percent dry solids. The indicated coagulant dosage was mixed with 250 milliliters of the sludge for 5 minutes with a wide-paddle stirrer rotating at 120 revolutions per minute. The conditioned slurry was transferred to a graduated column to observe the time required for the solids to settle to a level corresponding to 36 percent of the initial volume. After removing the supernatant liquid, the residual slurry (1.47 percent solids) was filtered on a 5.5 centimeter Buchner funnel at 40 millimeters of mercury. The filtrate volume collected during a 30-second interval is indicative of the relative efficiency of the coagulant. Adjustment of the sludge pH was made with hydrochloric acid or sodium hydroxide prior to treatment with coagulant.

TABLE VI

*Sedimentation and filtration of raw activated sludge*

| Coagulant | Coagulant Dosage Percent on Sludge Solids | Settling Time (sec.) | Filter Rate, ml./30 sec. | Filtrate, pH |
|---|---|---|---|---|
| None | 0 | 5,640 | 9 | 6.9 |
| Ferric Chloride | 5.3 | 5,700 | 15 | 4.7 |
| Do | 8.8 | 1,860 | 32 | 3.0 |
| Do | 10.6 | 2,010 | 41 | 2.6 |
| 5:1 AA-DEAPAA Copolymer (Viscosity 0.25% solution, 64 cstks. 20° C.) | 0.044 | 1,280 | 15 | 6.9 |
| Do | 0.088 | 390 | 17 | 6.9 |
| Do | 0.26 | 110 | 33 | 6.9 |
| Do | 0.35 | 70 | 49 | 6.9 |
| Do | 0.53 | 32 | 62 | 6.9 |
| Do | 0.70 | 35 | 61 | 6.9 |
| Do.[1] | 0.53 | 900 | 23 | 2.5 |
| Do.[1] | 0.53 | 60 | 49 | 4.5 |
| Do.[1] | 0.53 | 35 | 58 | 5.8 |
| Do.[1] | 0.53 | 80 | 41 | 9.3 |

[1] In these runs the pH of the sludge was altered before treating with the coagulant.

The polycationic coagulants produced extremely rapid sedimentation of the sludge solids at very low concentrations, significantly improved the filtration rate of the sedimented solids, and performed most satisfactorily at the normal pH of the solids.

In addition to the superior coagulating properties of the polycationic reagents, they also have the added advantage that their presence in the sludge in no way detracts from the end-use value of the sludge either as a fuel or as a fertilizer, and in some cases, actually improves the sludge value.

Paper mill effluent, an aqueous negatively-charged colloid of pulp fines, may be clarified by treatment with the polycationic coagulants of the present invention. A sample of "white water" containing 0.21 percent solids was treated with a dimethylaminopropylacrylamide-acrylamide copolymer having a molar ratio of cationic to nonionic units of 1:5. The viscosity of a 0.25 percent solution of the flocculant was 53 centistokes at 20° C. Two hundred milliliters of the "white water" were mixed with the coagulant for two minutes. A Buchner funnel which was sawed-off flush with the perforated disc was covered with No. 40 Whatman paper and inserted into the slurry for a 15-second filtration period at 30 mm. pressure. Table VII summarizes the results of these tests.

TABLE VII

| Percent Coagulant Based on Solids | Filtrate Volume, ml. per 15 seconds filtration |
|---|---|
| 0 | 31 |
| 0.125 | 94 |
| 0.250 | 108 |
| 0.500 | 128 |
| 0.750 | 140 |
| 1.000 | 150 |

As may be seen from the table, the filtration rates of the treated suspension were from 4 to 5 times higher than those obtained without the flocculant. The pulp fines which were recovered by filtering the polycationic-conditioned "white water" appeared to redisperse as readily as the untreated pulp fines. This property is also desirable since the pulp fines are returned to the stock system for reprocessing.

The flocculation technique of the present invention finds further application in the dewatering of ground wood prior to shipment. A ground wood pulp slurry containing 5.7 percent wood solids (dry basis) was diluted with water to a concentration of 1.58 percent solids to facilitate handling during the test. The coagulant was mixed with 100 milliliters of the diluted pulp by stirring with a 100 r.p.m. wide paddle stirrer for two minutes. The conditioned pulp was then added to a Gooch crucible which was extended with a glass cylinder to give sufficient freeboard to accommodate the entire pulp sample. A ¾-inch diameter filter paper disc was inserted in the crucible prior to adding the sample. The results are summarized in Table VIII.

TABLE VIII

| Coagulant | Viscosity of a 0.25% aqueous solution at 25° C. | Percent Coagulant Based on Solids | Filtrate Volume, ml./minute. |
|---|---|---|---|
| None | | 0 | 20 |
| Copolymer of DMAPA:AA 1:5 Molar Ratio | 99 | 0.125 | 49 |
| Do | 99 | 0.250 | 74 |
| Do | 99 | 0.500 | 120 |
| Copolymer of DEAPA:AA 1:5 Molar Ratio | 53 | 0.500 | 107 |

A five- to six-fold increase in filtration rate and greater clarity of filtrate were observed as a result of the coagulant treatment.

One hundred and fifty milliliter samples of a 15 percent silica slurry from a plate glass grinding operation were treated with the polycationic coagulant used in the treatment of the "white water." The treated slurry was stirred for one minute and filtered through a Buchner funnel at a pressure of 30 mm. Calcium hydroxide is commonly used for this purpose. The relative effect of calcium hydroxide and the polycationic reagent is illustrated in Table IX.

TABLE IX

| Coagulant | Percent Coagulant Based on Solids | Filtration Rate, ml./minute. |
|---|---|---|
| None | 0 | 159 |
| 1:5 DMAPA-AA | 0.0005 | 243 |
| 1:5 DMAPA-AA | 0.001 | 266 |
| 1:5 DMAPA-AA | 0.002 | 304 |
| 1:5 DMAPA-AA | 0.003 | 328 |
| 1:5 DMAPA-AA | 0.004 | 355 |
| Calcium Hydroxide | 0.102 | 229 |
| Do | 0.204 | 234 |

The filtration rate of the silica slurry was more than doubled by the use of 0.004 percent of the novel coagulant, and a significant improvement was noticeable by using a dosage as low as 0.0005 percent.

The technique of the present invention is equally effective in the flocculation of blood that has been inhibited against natural coagulation. Samples of dog blood which has been inhibited against natural coagulation with heparin were treated with a 1:5 diethylaminopropylacrylamide-acrylamide copolymer having a viscosity of 58 centistokes at 20° C. for a 0.25 percent aqueous solution. Flocculation was evident at dosages as low as 0.15 weight percent with massive flocs resulting on increasing the dosage to 0.35 weight percent based on blood solids.

This application is a divisional application based on co-pending application Serial No. 616,516, filed October 17, 1956.

What is claimed is:

1. As a new composition of matter, a water-soluble, linear copolymer suitable for use as a flocculant for negatively-charged colloids, consisting of polymerized acrylamide together with a polymerized dialkylaminopropylacrylamide selected from the group consisting of dimethylaminopropylacrylamide and diethylaminopropylacrylamide, said copolymer containing a total number of polymerized acrylamide units represented by the structural formula:

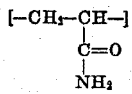

and polymerized dialkylaminopropylacrylamide units represented by the general formula:

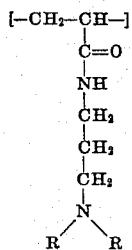

wherein R is an alkyl radical selected from the group consisting of methyl and ethyl radicals, such that there is present in the copolymer a proportion of from about 1 to about 13 polymerized acrylamide units per unit of polymerized dialkylaminopropylacrylamide.

2. As a new composition of matter, a copolymer as claimed in claim 1, having a molecular weight such that a 0.25 percent by weight aqueous solution of the copolymer has a viscosity of at least about 36 centistokes at a temperature of 20° C.

3. As a new composition of matter, a copolymer as claimed in claim 1, having a molecular weight such that a 0.25 percent by weight aqueous solution of the copolymer has a viscosity of at least about 60 centistokes at a temperature of 20° C.

4. As a new composition of matter, a copolymer as claimed in claim 3, wherein the proportion of polymerized acrylamide units to polymerized dialkylaminopropylacrylamide units in the copolymer is from about 5:1 to about 7:1.

References Cited in the file of this patent
UNITED STATES PATENTS 2,311,548     Jacobson et al. _____ Feb. 16, 1943
2,595,907     Thomas et al. _____ May 6, 1952